US006856799B1

(12) United States Patent
Ritter

(10) Patent No.: US 6,856,799 B1
(45) Date of Patent: Feb. 15, 2005

(54) COMMUNICATIONS SYSTEM, COMMUNICATION METHOD AND CORRESPONDING DEVICES

(75) Inventor: Rudolf Ritter, Zollikofen (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 09/869,126
(22) PCT Filed: Dec. 24, 1998
(86) PCT No.: PCT/CH98/00553

§ 371 (c)(1),
(2), (4) Date: Jun. 25, 2001

(87) PCT Pub. No.: WO00/40041

PCT Pub. Date: Jul. 6, 2000

(51) Int. Cl.[7] .............................. H04Q 7/32; H04Q 7/20
(52) U.S. Cl. ....................... 455/402; 455/402; 455/458; 455/572; 340/310.06; 340/310.02
(58) Field of Search ................................ 455/402, 458, 455/572, 14, 561, 457, 410, 422; 340/310.02, 310.06, 310.08, 870.02; 380/23, 30, 46

(56) References Cited

U.S. PATENT DOCUMENTS

| 4,777,652 | A | | 10/1988 | Stolarczyk | |
| 5,875,400 | A | * | 2/1999 | Madhavapeddy et al. ... | 455/458 |
| 5,940,512 | A | * | 8/1999 | Tomoike ..................... | 380/248 |
| 6,243,571 | B1 | * | 6/2001 | Bullock et al. ............ | 455/402 |
| 6,246,868 | B1 | * | 6/2001 | Bullock et al. ............ | 455/402 |
| 6,256,518 | B1 | * | 7/2001 | Buhrmann ................... | 455/572 |

FOREIGN PATENT DOCUMENTS

| DE | 40 31 092 | | 4/1992 | |
| EP | 0 689 368 | | 5/1997 | |
| GB | 2 322 998 | | 9/1998 | |
| GB | 2322998 | A * | 9/1998 | ............ H04Q/7/38 |
| WO | WO 97/00472 | | 1/1997 | |
| WO | WO 98/28865 | | 7/1998 | |

OTHER PUBLICATIONS

EDN Electrical Design Feature News, vol. 41, No. 12, pp. 71–72, 74, 76 and 78, "Powerline Communication: Wireless Technology", Jun. 6, 1996.

* cited by examiner

Primary Examiner—David Hudspeth
Assistant Examiner—Julio R Perez
(74) Attorney, Agent, or Firm—Oblon, Spivak, McClelland, Maier & Neustadt, P.C.

(57) ABSTRACT

Communications system in which at least certain mobile devices (1) are each able to be connected to a power supply network (4) via a connecting module (2), which connecting modules (2) comprise a power line communications module (21) by means of which said mobile devices (1) are able to communicate, via the said power supply network (4), with a visitor location register (5), which register is connected to the said, power supply network (4) via a power line communications module, user identifications (123) in particular, which are stored in an identification module (12), removably connected in each case to a mobile device (1), being transmitted by the mobile devices (1) via the said power supply network (4) to this power supply network visitor location register (5). Calls from terminals (91, 91') to respective mobile devices (1) connected to the power supply network are passed on by a mobile switching center (7) via the power supply network visitor location register (5) to the mobile devices (1), respectively transmitted in reverse direction to called terminals (91, 91') via the power supply network visitor location register (5) and the mobile switching center (7).

32 Claims, 1 Drawing Sheet

COMMUNICATIONS SYSTEM, COMMUNICATION METHOD AND CORRESPONDING DEVICES

Figure 1:
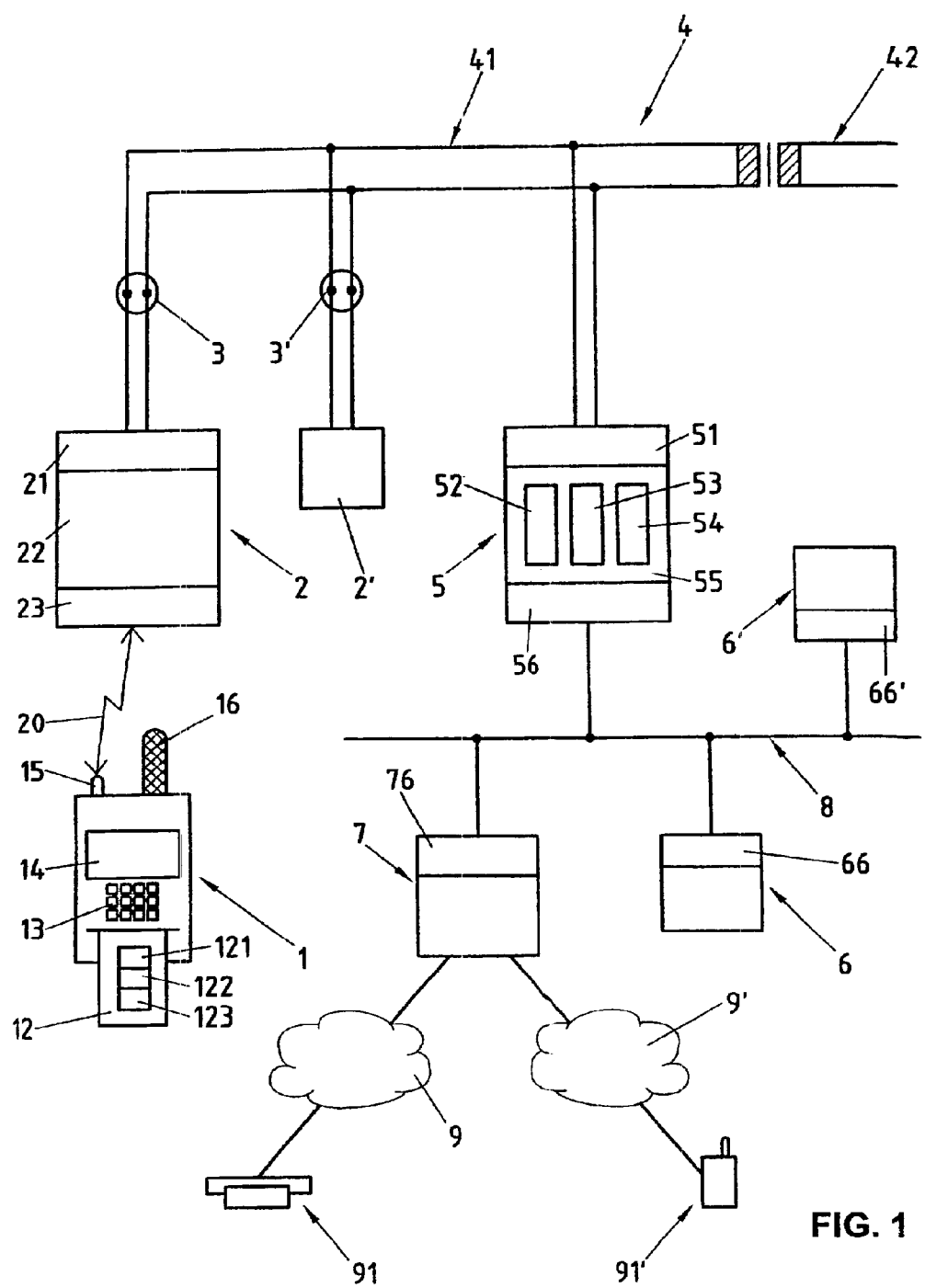

This invention relates to a communications system, a communications method and suitable devices. In particular, this invention relates to a communications system according to the preamble of claim 1, a communications method according to the preamble of claim 22 and suitable devices therefor.

Communications systems in which subscribers can move with their mobile devices into communications networks that are operated by foreign operators, for example (by means of a so-called roaming) are known. The practical achievement of roaming between mobile networks typically requires mutual agreements between the network operators concerned; first, however, the networks concerned must have correspondingly suitable mechanisms and devices in order to make roaming possible also technically. In particular the global system for mobile communications (GSM), defined by the European Telecommunications Standards Institute (ETSI, F-06921 Sophia Antipolis, Cedex, France) makes it possible for users of mobile devices to move out of the home mobile network (Home Public Land Mobile Network, HPLMN) into visited mobile networks (Visited Public Land Mobile Network, VPLMN). In a GSM mobile network user identifications are linked with call numbers and user data in a home location register (HLR) of the HPLMN. The user data comprise, among other things, location information for a respective user, which is transmitted, for example, from a visitor location register (VLR) of a VPLMN to the said HLR. The VLR recognizes the HLR of a visiting user on the basis of his user identification, which is stored in an identification module, removably connected to the mobile device of the user, and is transmitted by the mobile device to the VLR. The VLR transmits to the HLR, either upon request or automatically, a so-called roaming number, which is used by the HLR for further transmission of calls to the respective mobile device in the VPLMN. A so-called mobile switching center (MSC) of the GSM network has access to the information stored in the HLR, and serves, among other things, as the interface between the mobile network and the public switched telephone network (PSTN), and directs calls from calling terminals to said mobile devices, or respectively from said mobile devices to called terminals. Although the defined network architecture and the services related thereto support the so-called roaming of mobile devices in VPLMN, this is only possible if a user is located in the radio range covered by the VPLMN. In particular in big countries with areas that are thinly populated, for example, it can very well be that radio coverage is ensured only in the population centers. Moreover there are buildings and facilities in which no good radio reception is possible.

It is an object of this invention to propose a new communications system, a new communications method as well as new devices suitable therefor, which make it possible for users of mobile devices in particular to communicate with their mobile devices in areas that are not covered by radio and/or are covered by radio only by a network operator with whom respective users have no subscriber agreement.

This object is attained according to the present invention through the elements of the independent claims. Further preferred embodiments follow moreover from the dependent claims and from the specification.

In particular, this object is achieved through the invention in that at least certain mobile devices, for example mobile radio telephones or laptop or palmtop computers with suitable communications modules for mobile networks, for example GSM or UMTS networks, are able to be connected in each case to a power supply network by means of a connecting module, and in that these connecting modules each comprise a suitable power line communications module, by means of which said at least certain mobile devices are able to communicate via a said power supply network with other units which are connected to a said power supply network via a power line communications module. This has the advantage that these mobile devices are able to communicate also in areas that do not lie within the radio range of a mobile network and/or which lie in the radio range of a mobile network for which the user of the respective mobile device has no subscriber agreement, but have a power supply network to which these mobile devices can be connected.

Described in the patent publication DE 40 31 092 A1 is a telephone system in which connection of a telephone apparatus to the public telephone network is made possible with the aid of two modems, via current distribution lines. The advantage of the invention described in DE40 31 092 A1 consists in that too big a distance of a telephone apparatus to a telephone connection jack can be bridged over with the modem connection to a power supply line and with the modem connection of the telephone connection jack to this power supply line. The invention described in DE 40 31 092 A1 has as a prerequisite a local telephone connection, and is suitable only for a terminal which is supposed to be connected to the public telephone network via this telephone connection.

The communications system according to the present invention preferably comprises at least one visitor location register (VLR) which is connected to at least one said power supply network via a said power line communications module, and the mobile devices connected to a power supply network transmit user identifications, stored in identification modules removably connected to the mobile devices, via a power supply network to this power supply network VLR. These mobile devices, or respectively their users, are thereby able to register themselves with the VLR in a similar way as in a conventional mobile network.

In an embodiment variant, such a power supply network VLR comprises a table in which address data relating to the said connecting modules are linked with the associated said user identifications and are stored. This has the advantage that a respective connecting module and the mobile device associated therewith, or respectively its user, can be identified and addressed in a power supply network.

In a preferred embodiment variant, in addition, roaming numbers are linked in this table with associated user identifications and stored. As in a conventional mobile network, such roaming numbers can be transmitted from the power supply network VLR, either upon request or automatically, to the home location register of a respective user, where they are used for forwarding of calls to the respective mobile device in a power supply network.

In a conventional mobile network, location information, among other things, is stored in the HLR of a user for this user, which information is transmitted, for example, from a visitor location register (VLR) of a VPLMN to the HLR. The location information, which is transmitted from the power supply network VLR to the HLR of a user, preferably comprises address data relating to the said power supply network VLR, by means of which the location of the respective user is determined and the power supply network VLR can be addressed.

In an embodiment variant, the roaming numbers relating to mobile devices in a power supply network comprise address data relating to a said connecting module. Users in a power supply network, or respectively their mobile devices, can thereby be addressed via the associated connecting modules.

In a preferred embodiment, a power supply network VLR is connected to the HLR of the user via a connecting network and/or to a mobile switching center (MSC) in the home mobile network (Home Public Land Mobile Network, HPLMN) of the user. The connecting network 8 <sic.> is, for example, a local or wide area network (LAN or WAN), a dedicated backbone, an intranet or the Internet, and comprises, for example, a signalling system number 7 (SS7). The power supply network VLR can communicate with other network units connected to the connecting network, for example by means of MAP messages.

The power supply network VLR preferably comprises a gateway module, which is able to pass on calls from terminals to respective mobile devices, hooked up to a power supply network, connected to the power supply network VLR, which calls have been passed on to the said power supply network VLR via the said connecting network, and which gateway module is able to pass on calls from said mobile devices, hooked up to a power supply network, connected to the power supply network VLR, via the said connecting network, to a respective network unit, in particular a second said power supply network visitor location register, for further transmission to a called terminal. Such a gateway module extends the functionality of the power supply network VLR with functions that are typically carried out in a switching center, for example in a mobile switching center (MSC), so that calls can be passed on, for example also between a plurality of power supply network VLRs that are connected to different power supply networks.

The gateway module is preferably able to pass on calls to respective mobile devices connected to the power supply network that are received by a mobile switching center from calling terminals and have been passed on to the power supply network VLR, or respectively pass on to a respective mobile switching center calls from mobile devices connected to the power supply network for further transmission to a called terminal. A power supply network VLR with such a gateway module has the advantage that the communication between mobile devices connected to a power supply network and terminals in conventional mobile networks and/or fixed networks, for example the public switched telephone network (PSTN), can be carried out for the terminals concerned, or respectively for their users, in a transparent way via the power supply network VLR.

In a preferred embodiment, the power supply network VLR comprises a billing module, which is able to record and bill for services which have been carried out for a respective mobile device connected to the power supply network. This embodiment variant has the advantage that the costs are recorded directly at their point of origin, which simplifies the recording of power supply network-specific costs in particular. In an embodiment variant, the billing module can directly bill recorded services to a respective mobile device connected to the power supply network via the said power supply network, for example in that the costs are debited from a prepaid account, which is located, for example, on an identification module removably connected to the respective mobile device, for instance a chipcard. In another embodiment variant, the billing module is able to generate so called call detail records (CDR) for the recorded services and transmit them to a clearing point for billing.

In different embodiment variants, the connecting modules comprise an interface with contacts and/or a contactless interface, for example an infrared interface, an inductive interface or a high frequency radio interface, for example a so-called "bluetooth interface" via which they are able to be connected to the said mobile devices.

In an embodiment variant, the connecting modules comprise charging modules, by means of which energy storage devices for operation of the said mobile devices can be charged on the said power supply network.

In an embodiment variant, the said power supply network is a low voltage grid.

One embodiment of the present invention will be described in the following with reference to an example. The example of the embodiment is illustrated by the following single, attached figure:

FIG. 1 shows an overview diagram with a power supply network, to which a mobile device is connected via a connecting module, and with a connecting network, with home location register (HLR) and mobile switching center (MSC), which connecting network is connected to the said power supply network via a power supply network visitor location register.

In FIG. 1, reference numeral 1 refers to a mobile device, for example a mobile radio telephone or a laptop or palmtop computer, in each case with suitable communications modules for mobile networks 9, for example GSM networks, UMTS networks or other similar networks. Removably connected to the mobile device 1 is an identification module 12, for example a chipcard of plug-in or full size type, which has a processor and an electronic memory accessible to this processor.

As indicated symbolically by the arrow 20, the mobile device 1 can be connected to a connecting module 2 via an interface. This interface is, for example, an interface with contacts, for instance a plug-in connection with contact elements that are integrated into the housing of the mobile device 1 and of the connecting module 2, or a cable connection in which the mobile device 1 and the connecting module 2 have cable connection jacks and are connected to one another via a suitable cable. In an embodiment variant, this interface is a contactless interface, for example an infrared interface, for instance a high speed infrared interface (HSIR), an inductive interface, for example a home RF (radio frequency) interface or a high frequency radio interface, for instance a so-called "bluetooth interface." A corresponding transmission/reception element 15 is shown symbolically for the mobile device 1 in FIG. 1. Besides the hardware elements required for the respective interface, the mobile device 1 and the connecting module 2 comprise in addition the necessary software programs in order to communicate via this interface according to protocols known to one skilled in the art. A respective interface module 23, comprising the mentioned hardware elements and software programs, is schematically indicated for the connecting module 2. The mentioned software programs can be stored in the connecting module 2 in an electronic memory and can be executed in a processor. Such software programs can be stored, or respectively executed, in the mobile device 1 in an internal memory and processor of the mobile device 1, for example; the software program for the communication via the respective interface with the connecting module 2 can also be stored in the memory of the chipcard 12, however, and executed in the processor of this chipcard 12. In a further embodiment variant, the assignment of the storing and executing of software programs to a chipcard, or respectively to the mobile device can be carried out, for example, in accordance with the Mobile Execution Environment (MEXE) defined by the European Telecommunications Standards Institute (ETSI), customer-relevant data and security functions as well as keys and applets for particular applications being stored, for example, in the memory of the chipcard 12.

The connecting modules 2, 2' also have a connecting plug, either integrated into the housing of the connecting module 2, 2' or connected to the connecting module 2, 2' with a cable, with which they can be connected to the power supply network 4, for example via outlets 3, 3'. As shown schematically for the connecting module 2, the connecting modules 2 each comprise a power line communications module 21 with which a connecting module 2 can communicate via the said power supply network 4 with other units that are connected to the said power supply network 4 via such a power line communications module. A power line communications module 21, 51 comprises hardware and software components known to one skilled in the art for transmitting, or respectively receiving, digital data via power supply networks 4, for instance language data, program data, multimedia data, data telegrams or other data files, for example according to a power line communication (PLC) protocol.

The connecting modules 2, 2' each also comprise a transfer module 22, which accepts data received from the interface module 23 and passes it on to the power line communications module 23 for transmission via the power supply network 4, or respectively accepts data received from the power line communications module 21 and passes it on to the interface module 23 for transmission to the mobile device 1 via the described interface. The transfer module 22 is, for example, a programmed software module, which is executed for instance in the same processor as the software programs for the interface module 23 and/or for the power line communications module 21. Depending upon the protocols used on the interface side and the power supply network side, the transfer module 22 also undertakes, if applicable, necessary protocol conversions.

The reference numeral 5 refers to a visitor location register (VLR) for power supply networks, which register is achieved, for example, in a commercially available communications server, which has an above-mentioned power line communications module 51 and is connected by means thereof to the power supply network 4. Although this is not shown, the power supply network VLR 5 can also be connected to a plurality of power supply networks 4 via the power line communications module 51. In the example shown, the power supply network VLR 5 receives data via the power line communications module 51, which are transmitted, as described above, from a mobile device 1 via a connecting module 2 connected to the power supply network 4 and via the power supply network 4. In the reverse direction, the power supply network VLR 5 transmits by means of the power line communications module 51 data via the power supply network 4 and via the connecting module 2 to the respective mobile device 1 connected to this connecting module 2. For the addressing of the power supply network VLR, a generic address can be used, for example, so that the data transmitted from the mobile devices via a power supply network are transmitted in each case to the power supply network VLR 5 responsible for the respective power supply network 4; a power supply network VLR 5 can be responsible in each case, for instance, for an entire (or for more than one connected) low voltage grid 41, which is separated from the high voltage grid 42 through a symbolically shown transformer. In the reverse direction, the connecting modules hooked up to the power supply network 4 can be addressed individually by the power supply network VLR 5, each connecting module 2 being assigned, for example, it own unambiguous appliance number, or the connecting module 2 is assigned an address by the associated and connected mobile device 1, which address is derived, for example, from the user identification 123 stored in the identification module 12 of the mobile device 1 or from an appliance number of the mobile device 1.

As defined in the GSM standard, for example, a mobile device 1 transmits, for instance when put into operation, the unambiguous user identification 123 stored in the identification module 12, e.g. the international mobile subscriber identity (IMSI), to the visitor location register of a visited network. For the case where the mobile device 1, as described above, is connected to the connecting module 2 via an interface, the user identification is transmitted via this connecting module 2 through the power supply network 4 to the power supply network VLR 5. In a variant, the emission of the message with the user identification via the antenna 16 of the mobile device 1 can thereby be prevented if the mobile device 1 is connected to the connecting module 2. It can also be provided for that the user of the mobile device 1 is able to set a respective operating mode by means of the operating elements 13 of the mobile device 1.

The user identification transmitted via the power supply network 4 is received by the power line communications module 51 of the power supply network VLR 5, is accepted by a processing module 55 of the power supply network VLR 5 and is stored in a table 54, for instance together with the address of the transmitting connecting module 2. The processing module 55 is e.g. a programmed software module of the power supply network VLR 5.

As with a conventional GSM location update, the power supply network VLR 5 directs the location information to the home location register (HLR) 6 of the user of the mobile device 1, the processing module 55 of the HLR 6 being able, for example, to determine from the user identification an IMSI in particular. The location information comprises, for instance, a network address or a global title of the power supply network VLR 5.

For communication with the HLR 6, 6' of users, with further power supply network VLRs (not shown) and with other network units important for mobile communication, for example a mobile switching center (MSC) 7, the power supply network VLR 5 is connected to a connecting network 8 to which the mentioned network units are also connected. The connecting network is, for instance, a local or wide area network (LAN or WAN), a dedicated backbone, an intranet or the Internet, and comprises, for example, a signalling system number 7 (SS7), all network units connected to the connecting network 8 having available a corresponding communications module 56, 66, 66', 76 with suitable hardware and software elements for connection to, and for communication over, this connecting network 8. The communications modules 56, 66, 66', 76 have, for example, the functionality for exchange of so-called mobile application part (MAP) messages via the connecting network 8. The advantage of exchanging MAP messages, in particular via SS7, consists in that conventional network units such as HLR 6, 6' or MSC 7 possess the corresponding functionality and thus do not have to be adapted. Indicated by the HLR 6' in FIG. 1 should be that the users, who connect their mobile devices 1 to the power supply network 4 with a connecting module 2, can very well come from different home networks (Home Public Land Mobile Network, HPLMN) and be assigned to correspondingly different HLR 6, 6', the connecting network 8 being able to connect the power supply network VLR 5 to HLRs 6, 6' also across national borders. Although this is not shown, the same also applies for mobile switching stations (MSCs) and further power supply network VLRs, of which in each case several can be connected via the connecting network 8 with one (or more) power supply network VLRs 5, also across national borders.

Upon request of the HLR 6, or with each location update, the power supply network VLR 5 transmits to the HLR 6 of the user in addition a so-called roaming number which can be used by the HLR 6, for example, to pass on calls to the mobile device 1, connected to the power supply network 4, via the power supply network visitor location register 5, for instance. The roaming number can be determined e.g. by the above-mentioned processing module 55 and can be registered for the respective user in the mentioned table 54. The roaming number also comprises, for instance, address data relating to the connecting module 2 via which the mobile device 1 is connected to the power supply network 4.

As shown in FIG. 1, the power supply network VLR 5 further comprises a gateway module 53, which is able to pass on calls to respective mobile devices 1, connected to the power supply network 4, that have been received by a MSC 7 from calling terminals 91, 91' or by another power supply network VLR (not shown) from mobile devices, connected to a power supply network, and have been passed on to the power supply network VLR 5 on the basis of the location information for the respective user stored in the HLR 6. For the reverse direction, the gateway module 53 has the necessary functionality for passing on calls on the basis of the location information stored in the HLR of the respective called user, from mobile devices 1, connected to the power supply network 4, for further transmission to a respective MSC 7 or a further power supply network VLR (not shown). In the MSC 7, the calls are passed on to the respective called terminal 91 in a fixed network 9, for example the public switched telephone network (PSTN) 9, or respectively to the called mobile device 91' in a mobile network 91 <sic. 9'>, whereas these calls are further transmitted in a further power supply network VLR (not shown) to the respective called mobile device connected to a power supply network. The gateway module 53 is, for example, a programmed software module, which also executes, for instance, necessary protocol conversions between the protocols used in the power supply network 4 and in the connecting network 8, and deals with incoming and outgoing calls for the user of a mobile device 1, connected to the power supply network 4, in a transparent way via the power supply network VLR 5. It should be made clear here that this gateway module 53 has in particular a functionality that is not present in conventional VLRs, as are used in mobile networks; this applies in particular to functions which are conventionally carried out in a MSC.

In an embodiment variant, the power supply network VLR 5 further comprises a billing module 52, for example a programmed software module, which is able to bill the costs that arise during communication via the power supply network 4, via the power supply network VLR 5 and via the connecting network 8 to a respective user. The bill can be charged to the connected mobile device 1 for instance by the billing module 52 by means of the power line communications module 51 directly via the power supply network 4 and via the connecting module 2, for example in that the monetary amount to be billed is subtracted from a prepaid monetary amount 122 stored on a chipcard 12 removably connected to the mobile device 1. This direct billing can take place for example in such a way that the billing data are delivered by the billing module 52 to the power line communications module 51 in special short messages, for instance SMS (Short Message Service), USSD (Unstructured Supplementary Services Data) messages or short messages adapted to the power supply network, for transmission to the respective mobile device via the power supply network 4. As was described above, the transmitted short messages with billing data are received in the mobile device 1 and can be accepted by a special program application 121, for instance, stored on the chipcard 12, and, as mentioned, can be debited from the account 122 with the prepaid monetary amount. The completion of this direct billing task between the billing module 52 of the power supply network VLR 5 and the special program application 121 on the chipcard 12 in the mobile device 1 is carried out, for example, according to the SICAP method described in EP 0 689 368. In an alternative or supplementary variant, the billing module 52 transmits the billing data, for example via the connecting network 8 to a clearing point (not shown), for instance by means of so-called call detail records (CDRs), which clearing point charges the costs to be billed directly to the respective user, e.g. by means of an invoice sent through the post office or through debiting of a bank account of the respective user, or which clearing point transmits the costs to be billed to the home network operator of the respective user for further processing. One skilled in the art will understand that there are further possibilities for billing the mentioned costs to the user; in particular, the costs can be also recorded in the chipcard 12 and billed there, as has been described, for example, in the unpublished patent application PCT/CH97/00472 in the name of the present applicant, the duration of a call being determined by a time measuring device integrated into the chipcard 12 and the amount to be billed being established on the basis of the determined call duration and at least one tariff table stored in the chipcard 12. The amount to be billed described in this last variant can be debited directly against a prepaid account on the chipcard, for instance, or can be transmitted to a clearing point for further processing by means of CDRs.

It should be mentioned here that it definitely makes sense to carry out the data transmission via the power supply network 4 in a secured way. For this purpose, the power line communications module 21, 51 can be provided, for example, with security functions which operate, for instance, according to a point-to-point (PTP), according to a trusted third party (TTP) method, or according to another encryption method. The security functions can certainly also be carried out on a higher level, for instance in the mobile device 1 and in the power supply network VLR 5.

In an embodiment variant, the already described modules 21, 22, 23 of the connecting module 2 are combined with a charging module (not shown), which comprises hardware elements known to one skilled in the art, in order to charge on the said power supply network 4 energy storage devices for operation of a mobile device.

Although this was not described in detail, it can definitely make sense in certain situations and applications to communicate using mobile devices 1 connected to the power supply network 4 directly over this power supply network 4 with other mobile devices connected to the power supply network 4 and/or also with fixed terminals. The mobile devices can be connected thereby to the same power supply network 4, for instance, or they can be connected to different power supply networks, and via different power supply network VLRs 5 and the connecting network 8 and with the aid of information stored in the HLR 6, 6', for example location information for a respective called user, can communicate with each other, as has already been described. In particular, in areas that do not lie within the radio range of a mobile device, and/or in situations where an operator would like to operate a competing communications network for mobile devices without wanting to build the necessary mobile device infrastructure in less densely populated areas, it can be interesting for an operator to construct a communications system for power supply networks as has been described here. It should be emphasized thereby that the HLRs 6, 6' described do not necessarily need to be part of a mobile network, but instead they can be part of a power supply network communications system, a plurality of HLRs and power supply network VLRs being connected via an above-described connecting network 8, and being able to be operated in a similar way as in a conventional mobile network. The described communications system therefore can certainly be constructed as a power supply network comprehensive communications system via which mobile devices with described connecting modules and/or communications terminals with integrated connecting module functionality can communicate. Via an exchange, for example a MSC 7, such a power supply network comprehensive communications system as described can be connected to the public switched telephone network 9, 9'.

Besides the operation and/or installation of communications systems as have been described in the present invention, it can also be of interest in particular to sell or lease power supply network VLRs 5 to operators of communications networks and/or of power supply networks, or to extend conventional VLRs so that they can be employed as described as power supply network VLRs. Above all the described connecting modules 2 can be sold or leased to interested customers, above all customers staying in the areas or facilities initially mentioned and who wish to make use of their mobile devices

What is claimed is:

1. A communications system, comprising:
    a multiplicity of mobile devices, to which an identification module is connected in each case, in which identification modules a user identification of the user of the respective mobile device is configured to be stored in each case,
    at least one visitor location register, to which visitor location register user identifications of the users are configured to be transmitted each by one of the mobile devices and are to be stored there,
    at least one home location register, in which the user identifications are each configured to be linked to a call number and to further user data comprising location information for a respective user, the location information configured to be transmitted from the visitor location register to the home location register of a user, and
    connecting modules, by which connecting modules one of the mobile devices in each case is configured to be connectible by a user to a low voltage grid, the connecting modules each comprising a connecting plug configured to connect to the low voltage grid, by which connecting plugs the connecting modules are each configured to be connected to the low voltage grid via outlets of the low voltage grid, and the connecting modules comprising an interface module configured to connect to the respective mobile device, wherein
    the connecting modules each comprise a power line communications module by which the respective mobile device is configured to communicate via the low voltage grid with other units connected to the low voltage grid via the power line communications module, and wherein
    at least one visitor location register is connected to at least one low voltage grid by the power line communications module included in the at least one visitor location register, and wherein user identifications are configured to be transmitted to the at least one visitor location register via the low voltage grid by respective mobile devices.

2. The communications system according to claim 1, wherein the power supply network visitor location register comprises a table in which address data relating to connecting modules are configured to be linked to associated user identifications and are to be stored.

3. The communications system according to claim 2, wherein the power supply network visitor location register is configured to transmit to the home location register of a user a roaming number relating to the mobile device of this user, and wherein the roaming numbers are additionally configured to be linked in the table with associated user identifications and are to be stored.

4. The communications system according to claim 3, wherein at least certain of the roaming numbers comprise address data relating to a connecting module.

5. The communications system according to claim 1, wherein at least certain of the location information comprise address data relating to the power supply network visitor location register.

6. The communications system according to claim 1, wherein the communications system comprises a connecting network via which the power supply network visitor location register is configured to communicate with at least one home location register and/or at least one mobile switching center.

7. The communications system according to claim 6, wherein the connecting network comprises one of a SS7 signaling system, the Internet, and an intranet.

8. The communications system according to claim 6, wherein the power supply network visitor location register is configured to communicate, by means of MAP messages, with other network units connected to the connecting network.

9. The communications system according to claim 6, wherein the power supply network visitor location register comprises a gateway module configured to pass on calls from terminals to respective mobile devices when the calls have been passed on via the connecting network to the power supply network visitor location register, and the gateway module is configured to pass on calls from respective mobile devices via the connecting network to a respective network unit including a second power supply network visitor location register, to further transmit to a called terminal.

10. The communications system according to claim 1, wherein the power supply network visitor location register comprises a gateway module configured to pass on calls from terminals to respective mobile devices when the calls have been received from a mobile switching center and have been passed on to the power supply network visitor location register, and the gateway module is configured to pass on to a respective mobile switching center calls from respective mobile devices to further transmit to a called terminal.

11. The communications system according to claim 1, wherein the power supply network visitor location register comprises a billing module configured to record and bill for services that have been carried out for a respective mobile device.

12. The communications system according to claim 11, wherein the billing module is configured to bill recorded services to a respective mobile device directly via the low voltage grid.

13. The communications system according to claim 1, wherein the interface module comprises at least one of an interface with contacts, a contactless infrared interface, a contactless inductive interface and a contactless high frequency radio interface.

14. The communications system according to claim 1, wherein the connecting modules comprise charging modules by which energy storage devices configured to operate the mobile devices are chargeable on the low voltage grid.

15. A communications method comprising:
storing in identification modules user identifications of users of a multiplicity of mobile devices, the identification modules connected to the mobile devices,
transmitting by one of the mobile device to a visitor location register and storing in the visitor location register the user identifications of the users,
linking to a call number and to further user data and storing in a home location register the user identifications, the user data comprising location information for a respective user,
transmitting the location information from the visitor location register to the home location register of a user,
connecting by the users at least certain of the mobile devices to a low voltage grid by connecting module, the connecting module being connected to a low voltage network by a connecting plug of the connecting module via outlets of the low voltage network, and the connecting module being connected to the respective mobile device by means of an interface module of the respective connecting module, and
communicating the respective mobile device, by power line communications module of the connecting module, via the low voltage network, with other units, which are connected to the low voltage grid via the power line communications module,
wherein the visitor location register is connected to the low voltage grid via the power line communications module included in the visitor location register, and wherein the user identifications of mobile devices are transmitted to the visitor location register via the low voltage grid by the mobile devices.

16. The communications method according to claim 15, wherein address data relating to connecting modules are linked with associated user identifications and are stored in a table of the power supply network visitor location register.

17. The communications method according to claim 16, wherein the power supply network visitor location register transmits to the home location register of a user a roaming number relating to the mobile device of this user, and wherein roaming numbers are additionally linked in the table with associated user identifications and are stored.

18. The communications method according to claim 17, wherein at least certain of the roaming numbers comprise address data relating to a connecting module.

19. The communications method according to claim 15, wherein at least certain of the location information comprise address data relating to a power supply network visitor location register.

20. The communications method according to claim 15, wherein the power supply network visitor location register communicates, via a connecting network, with at least one of a home location register and a mobile switching center.

21. The communications method according to claim 20, wherein the connecting network comprises at least one of a SS7 signaling system, the Internet, and an intranet.

22. The communications method according to claim 20, wherein the power supply network visitor location register communicates by means of MAP messages with other network units connected to the connecting network.

23. The communications method according to claim 20, wherein the power supply network visitor location register passes on calls from terminals, by a gateway module to respective at least certain mobile devices when the calls have been passed on via the connecting network to the power supply network visitor location register, and wherein the power supply network visitor location register passes on, by the gateway module, calls from the at least certain mobile devices via the connecting network to a respective network unit, including a second power supply network visitor location register, for further transmission to a called terminal.

24. The communications method according to claim 15, wherein the power supply network visitor location register passes on, to respective at least certain mobile devices, by a gateway module calls received by a mobile switching center from calling terminals and have been passed on to the power supply network visitor location register, or respectively passes on to a respective mobile switching center, by the gateway module, calls from at least certain mobile devices for further transmission to a called terminal.

25. The communications method according to claim 15, wherein the power supply network visitor location register records and bills for services carried out for a respective at least certain mobile device, a billing module.

26. The communications method according to claim 15, wherein the billing module bills recorded services to a respective at least certain mobile device directly via the low voltage grid.

27. The communications method according to claim 15, wherein the interface module comprises at least one of an interface with contacts, a contactless infrared interface, a contactless inductive interface and a contactless high frequency radio interface.

28. The communications method according to claim 15, wherein, by charging modules, the connecting modules charge on the low voltage grid energy storage devices for operation of the mobile devices.

29. A connecting module for a communications system including a multiplicity of mobile devices, to which an identification module is connected in each case, in which identification modules a user identification of the user of the respective mobile device is configured to be stores in each case, at least one visitor location register, to which visitor location register user identifications of the users are configured to be transmitted each by one of the mobile devices and are to be stored there, and at least one home location register, in which the user identifications are each configured to be linked to a call number and to further user data including location information for a respective user, the location information configured to be transmitted from the visitor location register to the home location register of a user,
the connecting module is configured to connect at least certain of the mobile devices to a low voltage grid in each case by the connecting module, the connecting module comprising a connecting plug configured to connect to the low voltage grid, by which connecting plug the connecting module is configured to be connected to the low voltage grid via outlets of the low voltage grid, and the connecting module comprising an interface module configured to connect with a respective mobile device, and
the connecting module comprises a power line communications module, by which the respective mobile device is configured to communicate via the low voltage grid with other units connected to the low voltage grid via the power line communications module, and the connecting module configured to store address data by which the connection module is addressable in the low voltage grid and by which the connection module is configured to be linked to associated user identifications in a visitor location resister connected to the low voltage grid via the power line communications module.

30. The connecting module according to claim 29, wherein the interface module comprises at least one of an interface with contacts, a contactless infrared interface, a contactless inductive interface, and a contactless high frequency radio interface.

31. The connecting module according to claim 29, further comprising:

a charging module by which an energy storage device configured to operate a mobile device is chargeable on the low voltage grid.

32. The connecting module according to claim 29, where the at least certain mobile devices each comprise a mobile radio telephone.

* * * * *